Figure 1:
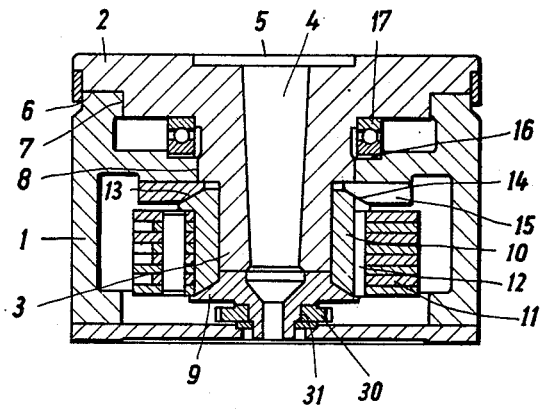

June 16, 1964     K. SCHUBERT     3,137,183

INDEXING ATTACHMENT WITH PRE-SETTING OF INDEXING

Filed Feb. 17, 1961     2 Sheets-Sheet 1

(A-B)

Inventor:
Karl Schubert
By Watson, Cole, Grindle & Watson
Attys.

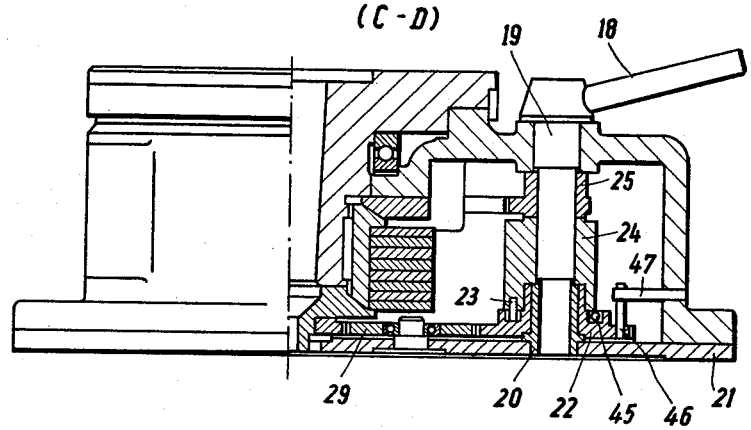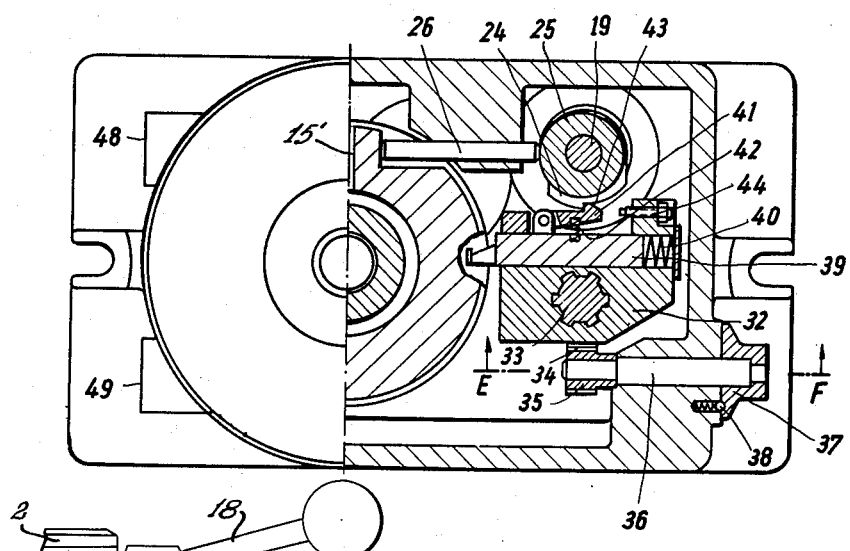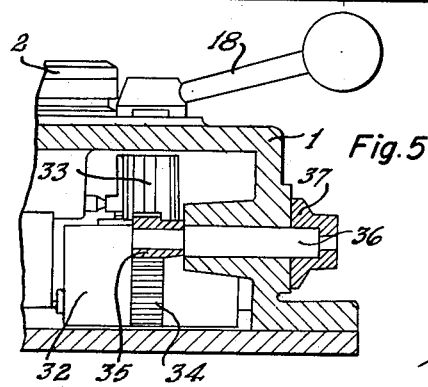

3,137,183
INDEXING ATTACHMENT WITH PRE-SETTING OF INDEXING

Karl Schubert, Dusseldorf, Germany, assignor to Firma Rheinmetall G.m.b.H., Dusseldorf, Germany
Filed Feb. 17, 1961, Ser. No. 89,972
Claims priority, application Germany Feb. 20, 1960
6 Claims. (Cl. 74—823)

In addition to the generally known differential indexing attachments comprising a perforated index plate, worm and worm wheel, indexing attachments are known which can be arranged for a given indexing action by changing the index plate. Changing the index plates can be avoided by employing cover plates, which are also known, i.e. only one index plate having, for example, twenty-four notches is required, but for each indexing which is lower than twenty-four a special cover plate must be provided which can be exchanged in each instance for another one. In this way, misdivision is avoided.

Furthermore, indexing attachments are known in which the dividing operation is initiated by shifting a rack as far as an adjustable stop. By shifting the rack, a pinion arranged coaxially with the face plate of the indexing attachment and fixedly connected to it is rotated by the respective indexing amount, the locking pin securing the necessary accuracy of division being engaged and disengaged automatically by means of a suitable lever arrangement.

Indexing attachments are moreover known which, for example provide an adjustable stop in a groove extending in a circle around the dividing centre, said stop determining the desired division or accuracy of division.

Finally, indexing attachments are also known the locking pin of which comprises an eccentrically arranged locking projection. Said locking projection is brought into the range of the desired index plate by rotating the locking pin. However, the number of index plates which can be fitted at the same time in the indexing attachment in this construction is limited as a rule to two or three. The locking projection does not ensure adequate and constant accuracy of division.

The drawback of the indexing attachments heretofore known and described in broad outline resides, on the one hand, in that, for example in differential indexing attachments, the danger of misdivision is very great and, on the other hand, in that a considerable time is required for changing over to another indexing, so that the proportion of undesirable idle periods in the process of manufacture has an extremely unfavourable effect. Furthermore, the known constructions meet the requirements of simple handling and rigid mounting of the workpiece only more or less incompletely.

The invention avoids the drawbacks which have obtained hitherto. It differs from the known constructions in particular by a set of index plates consisting of a plurality of such plates disposed axially one above the other and by an index pin or locking pin movable radially outside said set of index plates and parallel thereto and designed to engage in a peripheral notch in the particular index plate selected.

In a preferred embodiment according to the invention, the index or locking pin is mounted, and sprung axially, in a slide or the like having a rack-like toothing for moving the same up and down vertically by means of a pinion engaging in said toothing and mounted on a rotatable spindle or the like having a knob for adjusting the slide to the particular index plate height desired.

As a further feature of the invention, this index or locking pin carries a spring-urged latch or the like for withdrawing the pin from the peripheral groove in the selected index plate by means of a cam or driver mounted on the driving shaft of a toothed wheel gearing which can be operated by means of a hand lever and serves both for rotating the index plates and also for clamping or securing the face plate of the indexing device. This cam or driver as a further feature of the invention, is fixedly connected to an entrainment member for entraining the driving pinion of the toothed wheel gearing, in such manner that the entrainment of the driving pinion takes place only when the locking pin has released the index plate in question. A stop, for example a stop pin, is provided for disengaging the spring-urged latch from the driver after the locking pin has left the notch in the index plate.

The invention has the advantage that the idle periods are extremely small and this is advantageous in those cases where single pieces or small series divided in different ways are to be machined on a machine tool in many variations by means of the indexing attachment. The indexing attachment permits the pre-setting of, for example, eight different indexings in a very simple manner. Only a single swinging out of a hand lever is required for all the functions of the indexing attachment. The time for pre-selecting the required indexing is only a few seconds, while, for example, in the case of twenty-four notch indexing, about one hundred indexing cycles per minute are possible. The separate operations of an indexing cycle comprise: Unclamping and simultaneous raising of the face plate, disengagement of the index or locking pin, further rotation of the face plate by one division engagement of the index or locking pin, lowering of the face plate on to the housing and simultaneous clamping thereof. All these operations are effected by swinging out the above-mentioned hand lever once.

Figure 2:
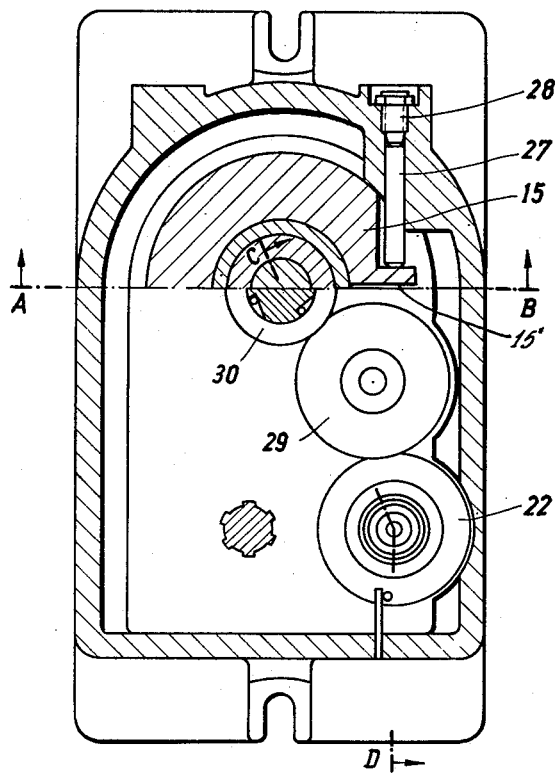

Details of the invention will appear from the following description of the embodiment illustrated in the drawing, in which:

FIGURE 1 is a section through FIGURE 2 taken on line A—B in the direction of the arrows, FIGURE 2 is a horizontal longitudinal section through the indexing attachment with the preselector device removed, FIGURE 3 is a part cross section through FIGURE 2 taken on line C—D in the direction of the arrows, FIGURE 4 shows the indexing attachment partly in horizontal section and partly in plan view, and FIGURE 5 is a section through the indexing attachment shown in FIGURE 4 taken on line E—F in the direction of the arrows, only through that part which is located in front of the slide of the preselector device.

In the housing 1 of the indexing attachment is rotatably mounted the face plate 2 which has on its underside a journal-like extension 3 with a through axial bore 4, the shape of which can be seen in FIGURE 1. On the end face of the face plate 2 there is a concentric recess 5 for receiving workpiece clamps.

The face plate 2 is mounted radially in the housing 1 at two places, namely once at 7 and in the other case at 8, and also has an annular surface 6 on its back for bearing on a corresponding surface of the housing 1 when the plate is locked or clamped.

The journal-like extension 3 is provided at its lower end with a thrust piece 9 connected detachably thereto by means of screws and serving as a support for a bush 10 on whose outer periphery the set of index plates 11, which consists of several such plates, is arranged. The transmission of the torque from the face plate to the bush 10 and the index plates forming the set 11 is effected in known manner by way of fitting keys. One fitting key 12 can be seen in FIGURE 1 and by means of this key the torque is transmitted from the bush 10 to the index plates.

The bush 10 has a conical surface 13 at its top end and said conical surface serves as a counterpressure surface for another conical surface 14 which is arranged at the inner edge of an annular disc 15 having a radial slot 15'. Said annular disc 15 is supported at the top against the housing 1. The disc can be compressed radially and thereby exerts a pressure with its conical surface 14 on the conical surface 13 of the bush 10, which is thereby urged downwardly axially and, by way of the thrust piece 9 and the journal-like extension 3, presses the face plate 2 tightly at its bottom annular surface 6 against the corresponding annular surface of the housing 1 in opposition to the pressure of a number of cup springs 16 by which the ball bearing 17, which is mounted on the underside of the face plate 2, is sprung axially. If the pressure on the bush 10 is terminated, i.e. if the annular disc 15 expands, the cup springs 16 urge the ball bearing 17, and thereby the face plate 2, upwardly, whereby the annular surface 6 of the face plate 2 is lifted away from the corresponding annular surface of the housing 1.

A hand lever 18 by which all the operations of the indexing attachment, with the exception of pre-setting, are initiated is used for locking or clamping the face plate 2 in the manner described above. This hand lever 18 is mounted at one end of a multi-stepped shaft 19 the lower end of which is surrounded by a bush 20 mounted at its lower end in the base plate 21 of the indexing attachment. On the bush is mounted the driving pinion 22 of the indexing attachment which is connected in driving relationship to the lower end of a cam or driver 24 by means of an entrainment or coupling pin 23. The function of the driver or cam will be described in detail hereinafter. An eccentric 25 is mounted on the shaft 19 above the driver 24 and serves to actuate a pressure pin 26 which acts secantially on the annular disc 15 and serves to compress it, whereby the downwardly directed clamping or locking pressure is transmitted by way of the bush 10, the thrust piece 9 and the journal-like extension 3 to the face plate 2. A pin 27 serves to prevent rotation of the annular disc 15 and is mounted in the housing by means of trunnion screw 28.

The driving pinion 22 is in mesh with an intermediate gear 29 meshing with a gear 30 containing a locking and freewheel device and mounted on the journal-like extension 31 of the thrust piece 9. Owing to the special nature of the known locking device, the result is obtained that, when indexing is being carried out, the face plate 2 can be rotated only in one direction, whereas when the hand lever 18 is swung back the gear 30 runs along idly and the face plate 2 is in the inoperative position.

A slide 32 is used for pre-setting the particular index plate or indexing desired, said slide being slidable up and down and parallel to the set of index plates on a multi-key or polygonal spindle 33 mounted at one end in the base plate 21 and at the other end in the top of the housing 1. To this end, the slide is provided on one side with a toothing formed as a rack 34 and with which there meshes a pinion 35 mounted on a shaft 36. On that end of the shaft 36 which projects from the housing 1 of the indexing attachment there is mounted a so-called preselector dial 37 which, according to the number of index plates, i.e. the number of different indexing possibilities, is provided on that side which faces the housing 1 with corresponding recesses in which a ball 38 which is under spring tension engages for locking purposes.

To preselect the indexing, it is necessary to bring the index plates into the zero position marked on the outside of the housing 1, in which position the notch of all the index plates which is marked with the number 1 and the end of the locking pin 39 are located in the same vertical plane. Said locking pin 39 is mounted in the slide 32 so as to be axially slidable therein and is sprung in this direction by a spring. By means of this spring, the locking pin is urged in the direction of the periphery of the set of index plates 11.

On the locking pin 39 there is pivotally mounted a latch 41 behind which there engages the above-mentioned driver 24 mounted on the shaft 19. Thus, when the shaft 19 is suitably rotated, the latch 41 draws the locking pin 39 out of the particular notch in the index plate concerned. The latch 41 is supported by a spring 42 with respect to the locking pin 39. The latch 41 is thereby held in engagement with the driver 24. The latch has an inclined surface 43 on its head. Moreover, an adjustable stop pin 44 in the form of a trunnion screw is provided against which the inclined surface 43 strikes when the latch 41, and thereby the locking pin 39, is retracted. The latch is thereby released from the driver 24 in oposition to the pressure of the spring 42, so that the locking pin is again snapped into its feeling position by the spring 40.

The face plate 2 is first brought into the zero position by means of the hand lever 18. This position is recognisable by means of special markings on the face plate 2 and the housing 1. The desired indexing can now be adjusted by means of the preselector dial 37. As the preselector dial 37 is rotated, the slide 33 is so moved along the vertical spindle 33 by way of the pinion 35 and the rack 34 that the locking pin 39 is brought into the plane of operation of the selected index plate and fixed with its index head or end the first notch in said index plate.

If, after the preselection has been completed, the hand lever 18 is swung out to the left, the driving pinion 22 is set in rotation by way of the shaft 19, the driver 24 and the entrainment pin 23, as is also, by way of the intermediate gear 29, the gear 30 mounted on the part 31 of the thrust piece 9. In this process, the rotary movement is transmitted by way of the locking device mounted in the gear 30 to the thrust piece 9 and from here, by way of the journal-like extension 3, to the face plate 2. The bush 10 mounted on the journal-like extension 3 rotates simultaneously with the face plate 2. Said bush carries along the index plates forming the set 11. At that instant when the notch in the index plate in question arrives in front of the tip of the locking pin 39, the tip resting against the periphery of said index plate, said tip jumps into the notch. The index plate is thereby locked against any further rotation. The same applies to the face plate 2, which is connected to the set of index plates. The hand lever 18 is now swung in the opposite direction, for example to the right. In this process, no rotary movement in the previous direction is exerted on the toothed wheel gearing 22, 29, 30, but on the contrary, the driving pin 23 is brought back to its initial position by a return spring 45, which is mounted in a suitable groove in the pinion, until a stop pin 46 mounted on the pinion strikes against a stop pin 47 projecting inwardly horizontally from the wall of the housing. This return movement effected by the spring is rendered possible by the fact that the toothed wheel gearing is rotated in this process by the force of the spring in opposition to the clamping action of the freewheel locking device which is mounted in the gear 30.

When the hand lever 18 is rotated to the right, the eccentric 25 presses the pressure pin 26 secantially against the annular disc 15, which is thereby compressed, since it is prevented from rotating by the pin 27. Owing to the compression, the conical surface 14 of the annular disc 15 presses on the conical surface 13 of the bush 10, which thereby draws the face plate 2 downwardly, by way of the thrust piece 9 and the journal-like extension 3 mounted thereon, in opposition to the pressure of the spring 16 until the annular surface 6 is bearing tightly against the corresponding annular surface of the housing 1. The face plate 2 is then thereby fixed or clamped in the vertical direction.

Release of the face plate and disengagement of the locking pin from the respective index plate are effected in the reverse order when the hand lever 18 is swung in the respective opposite direction. In this process, after the eccentric 25 has released the pressure pin 26 and the annular disc 15 has expanded, so that the spring 16 can push the face plate 2 upwardly, the locking pin 39, as the hand lever 18 is rotated, is withdrawn from the notch in the index plate in the direction opposite to the movement of release of the clamping means of the face plate. As the lever 18 is rotated further, the driver 24 carries the locking pin along further until the inclined surface 43 of the latch 41 strikes against the stop pin 44. The latch 41 is thereby swung towards the locking pin 39 in opposition to the pressure of the spring 42 and releases the driver 24. The spring 40 now drives the locking pin forward again and the pin now rests with its head against the periphery of the index plate concerned. Advantageously, however, the locking pin is brought into its new position beforehand by shifting the slide 32 of the preselector device, since it would otherwise engage in the old notch again on jumping forward.

The invention is not limited to the embodiment illustrated and described. Thus, it is also possible to employ a pneumatic or hydraulic drive instead of the mechanical drive shown.

In order to increase the possibilities of use of the indexing attachment, a vertically and horizontally adjustable drilling bush holder can be screwed to the surfaces 48, 49 of the housing 1.

What I claim is:

1. An indexing attachment for changing the angular position of a workpiece or the like comprising a set of index members consisting of a plurality of plates disposed one above the other and having peripheral notches therein, a slide, and an axially spring-urged locking pin mounted in the slide and movable transversely relative to the set of index plates, said locking pin engaging in the indexing notches selected by moving the slide to the height of the index plate selected.

2. An indexing attachment according to claim 1, in which a pinion and a toothed rack are provided on the slide for moving the slide up and down vertically by means of the pinion engaging in said toothed rack, and in which a rotatable spindle with a knob is provided acting as a preselector dial for adjusting the slide at the index plate height desired.

3. An indexing attachment for changing the angular position of a workpiece or the like comprising a set of index members consisting of a plurality of plates disposed one above the other and having peripheral notches therein, a slide, an axially arranged spring-urged locking pin mounted in the slide and movable transversely relative to the set of index plates, said locking pin engaging in the indexing notches selected by moving the slide to the height of the index plate selected, a pinion, a toothed rack on the slide for moving the slide up and down vertically by means of the pinion engaging in said toothed rack, a rotatable spindle with a knob acting as a preselector dial for adjusting the slide at the index plate height desired, a driving shaft and a driver thereon, a gearing on the driving shaft, a spring-urged latch carried by the locking pin to withdraw the pin from the peripheral notch in the selected index plate by means of the driver, a hand lever, and a face plate, the driving shaft being provided with the hand lever so that both the set of index plates and the face plate are set in rotation by means of the gearing and the face plate is rotated by the angular amount predetermined in any particular instance by the notches.

4. An indexing attachment according to claim 3, in which the spring-urged latch is provided for the purpose of withdrawing the locking pin, the driver being fixedly connected to the latch member for entraining a driving pinion of the gearing so that the entrainment of the driving pinion takes place only after the locking pin has been disengaged.

5. An indexing attachement according to claim 3, in which a stop is provided with the stop and the spring-urged latch are operative so that the stop disengages the spring-urged latch of the locking pin from the driver after the locking pin has been disengaged from the notch in the index plate.

6. An indexing attachment according to claim 3, in which a stop is provided so that the stop and the spring-urged latch are operative so that the stop disengages the spring-urged latch of the locking pin from the driver after the locking pin has been disengaged from the notch in the index plate, and in which the stop is in the form of an adjustable turning screw.

References Cited in the file of this patent

UNITED STATES PATENTS

| | | |
|---|---|---|
| 1,662,959 | Crumrine | Mar. 20, 1928 |
| 2,135,639 | Gorham | Nov. 8, 1938 |
| 2,375,114 | Kylin | May 1, 1945 |
| 2,921,487 | Schabot | Jan. 19, 1960 |
| 2,952,169 | Johnson | Sept. 13, 1960 |